Jan. 6, 1959 B. L. MIMS 2,867,113
DIRECT READING TORQUE TESTER
Filed Feb. 7, 1955 2 Sheets-Sheet 1

INVENTOR.
BRUCE L. MIMS
BY Henry L. Shevier
ATTORNEY

United States Patent Office 2,867,113
Patented Jan. 6, 1959

2,867,113
DIRECT READING TORQUE TESTER
Bruce L. Mims, Danbury, Conn., assignor to The Barden Corporation, Danbury, Conn., a corporation of Connecticut Application February 7, 1955, Serial No. 486,375
9 Claims. (Cl. 73—9)

My invention relates to a direct reading torque tester and more particularly to an improved bearing torque tester for rapidly and expeditiously measuring the average torque and torque variation characteristics of a rolling bearing under load.

In the manufacture and use of precision rolling bearings, the torque characteristics of the bearings are of great importance. Various devices are employed in the prior art to determine the torque characteristics of rolling bearings under load. In one type of tester a slowly rotating spindle carries one of the bearing races of the bearing under test for rotation therewith. Means is provided for loading the other race of the bearing. A transducer or the like restrains the loaded race from rotation and measures the restraining force to afford an indication of the torque, or rotational effort, owing to bearing friction. In another type system employed in the prior art, a torque restoring device opposes the tendency of the loaded race to rotate.

These devices of the prior art embody a number of disadvantages. Owing to the high moment of inertia of the loaded race, loading mechanism, and transducer, the driven race must be rotated at a very low speed if excessive damping of the tester indicating device or recorder is to be avoided. The inertia and damping of the indicating device or recorder itself adds to this disadvantage. Typical speeds employed in testers of the prior art are in the range of from 0.1 to 2.0 R. P. M. If higher speeds are employed, variations in torque resulting from irregularities in the bearing are damped to an extent where the peaks of the trace issuing from the tester recorder are only a small fraction of the true peaks inherent in the bearing being tested. In other words, the response of the torque testers of the prior art is so poor that extremely slow speeds must be used in testing. The test time in testing a bearing over the course of two revolutions by devices of the prior art may range from one to ten minutes or more. A second disadvantage of the testers of the prior art is the difficulty of interpreting the recording trace and determining what trace indicates an acceptable bearing. This latter disadvantage is of great importance when the tester is to be used in connection with a production line.

I have invented a direct reading torque tester which overcomes the disadvantages of the testers of the prior art. My tester determines the torque characteristics of a loaded bearing under test in a rapid and expeditious manner without damping torque variations resulting from inherent defects in the tested bearing. I have provided my tester with means for separating the average torque indication from the torque variation indication to give a direct indication of whether or not the bearing tested meets arbitrary acceptance standards. Thus, no interpretation of a combined recorder trace is necessary.

One object of my invention is to provide a direct reading torque tester for ball bearings which overcomes the defects of torque testers of the prior art.

A further object of my invention is to provide a direct reading torque tester for determining the torque characteristics of rolling bearings under load in a rapid and expeditious manner.

Another object of my invention is to provide a direct reading torque tester for determining the torque characteristics of rolling bearings under load without excessively damping variations in torque resulting from defects in the bearing being tested.

A still further object of my invention is to provide a direct reading torque tester for determining the torque characteristics of a rolling bearing without the necessity of interpreting a recorder trace.

Yet another object of my invention is to provide a direct reading torque tester for directly indicating the average torque characteristic and torque variation characteristic of a rolling bearing under load.

Other and further objects of my invention will appear from the following description.

In general my invention contemplates the provision of a rolling bearing torque tester including means for applying a rotating force to one of the races of the bearing under test. I provide means having a very low moment of inertia for applying a load to the other of the bearing races without at the same time transmitting the load inertia. The tendency of the loaded race to rotate as the driven race rotates is measured by a transducer. Owing to the low moment of inertia of the loading applying means, high testing speeds can be employed. I separate the output signal from the tester transducer into two parts, one of which represents average torque and the other of which represents torque variation. Respective indicating means actuated by the separated signals give direct indications of bearing torque characteristics.

In the accompanying drawings which form part of the instant specification and which are to be read in conjunction therewith and in which like reference numerals are used to indicate like parts in the various views.

Figure 1:
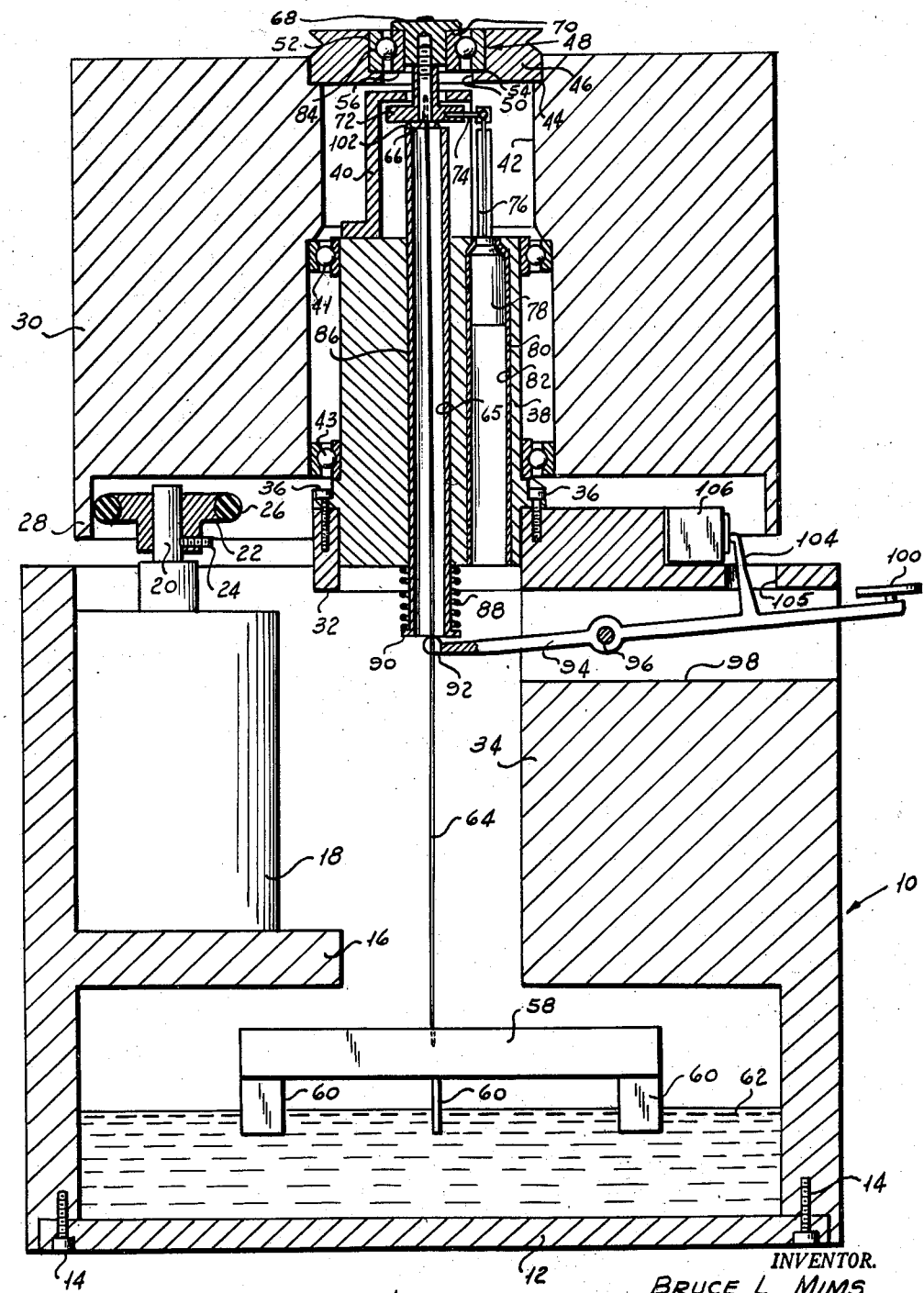
Figure 1 is a sectional elevation of one form of my direct reading torque tester.

More particularly referring now to Figure 1, my torque tester includes a hollow base, indicated generally by the reference character 10, the bottom of which is closed by a plate 12 secured to base 10 by screws 14. I form a platform 16 in the interior of base 10 and mount a drive motor 18 on it by any convenient means. Motor 18 includes a shaft 20 to which I fix for rotation therewith a drive member 22 by means of a set screw 24. A ring 26 of friction material, such as rubber or the like, forms the outer periphery of drive member 22. Rings 26 engages the inner surface of an annular depending flange 28 formed at the base of the bearing support rotor 30 of my tester.

I form a ring support 32 on an enlarged portion 34 formed in the interior of base 10. Ring 32 is coaxially disposed with respect to the axis of base 10. Suitable means, such as screws 36, secure a locking yoke support member 38 to the ring support 32. I mount a locking yoke 40 on support member 38 by any convenient means, such as welding or the like. Trunnion bearings 41 and 43 disposed between a central bore 42 in rotor 30 and the support member 38 rotatably support rotor 30. The inner races of bearings 41 and 43 are supported by any convenient means on support 38 and the outer races support rotor 30.

An annular shoulder 44 at the top of bore 42 supports an outer bearing race adapter 46. I place the bearing to be tested, indicated generally by the reference character 48, within a bore 50 formed in adapter 46 with its outer race 52 resting on an annular bore shoulder 54. It will be appreciated that as motor 18 drives shaft 20, rotor 30 is driven to rotate adapter 46 and the outer race 52 of bearing 48.

I apply a gravity load to the inner race 56 of bearing 48 by means of a loading rotor 58 formed with a number of damping blades 60 disposed in a supply of damping fluid 62 retained within base 10 by plate 12. I fix one end of a thin supporting wire 64 in the end of a threaded stud 66 carried by an inner bearing race adapter 68. Wire 64 passes through an axial bore 65 in support 38 to the loading rotor 58. The end of wire 64 remote from stud 66 carries rotor 58. An annular shoulder 70 formed on the adapter 68 supports the adapter and the load on the inner race 56.

Head 72 or the like on the end of stud 66, to which wire 64 is secured, carries a torque arm 74 which engages the probe 76 of an electronic transducer tube 78. A sleeve 80, disposed in a bore 82 formed in support member 38, carries tube 78. When a bearing is being tested, outer race 52 rotates by reason of the friction drive provided by member 22. As the outer race 52 rotates, the inner race 56 tends to rotate owing to the friction between the rotating members, such as balls 84 of bearing 48, and the bearing races 52 and 56. Torque arm 74 of the transducer system resists the tendency of the inner race 56 to rotate. It will be appreciated that some small displacement of torque arm 74 takes place so that transducer 78 produces an output signal. This signal represents the instantaneous torque transmitted by the bearing under test. It may be fed to any suitable indicating device, as will be described hereinafter.

In order to deactivate loading rotor 58 when a test is to be commenced or when a test has been completed, I slidably mount a locking tube 86 in the central bore 65 in member 38. It will be understood that wire 64 passes through tube 86. A coil spring 88 surrounding the lower end of tube 86 bears at one end against the bottom of support 38 and at the other end against an annular flange 90 formed on the bottom of tube 86. It will be appreciated that spring 88 normally biases tube 86 in a downward direction as viewed in Figure 1. The bifurcated end 92 of a lever 94 pivotally supported on a pin 96 disposed in a slot 98 formed in the portion 34 of base 10 supports tube 86. The end of lever 94 remote from end 92 carries a finger button 100. When it is desired to deactivate the loading rotor 58, the button is pressed to rotate lever 94 in a clockwise direction as viewed in Figure 1. End 92 raises tube 86 and projectons 102 on the top of tube 86 raise head 72 to bring it into engagement with locking yoke 40. This action immobilizes rotor 58 and relieves the bearing 48 of the load provided by loading rotor 58. A finger 104 is formed on lever 94. This finger 104 extends up through a slot 105 formed in the top portion 34 of base 10. In the inactive position of lever 94 to which it is urged by spring 88, finger 104 engages and operates a switch 106. Switch 106 is connected in the circuit of motor 18 and completes the motor circuit when operated. Consequently, when lever 94 is in its inactive position, motor 18 is energized. When button 100 is pressed to relieve the bearing under test of its load, finger 104 moves to a position where switch 106 opens and motor 18 is de-energized.

The arrangement of my tester is such that the output signal from transducer 78 is very nearly truly representative of the input torque from the bearing under test even when heavy test loads are used. I have constructed my tester so that the polar moment of inertia of the assembly, including the inner race 56, the adapter 68, the wire 64, and the loading rotor 58, is very nearly that of the inner race and adapter only. The polar moment of inertia of the inner race 56 is a fixed quantity. The polar moment of inertia of the adapter 68 is lessened by design and by the use of a very light material, such as magnesium, "Synthane," or the like. Since the polar moment of inertia of a cylindrical body about the axis of the cylinder is directly proportional to the square of the diameter of the cylinder, it will be clear that supporting wire 64 has a very small polar moment of inertia. As has been pointed out hereinabove, wire 64 transmits the load provided by rotor 58 to the inner race 56 without at the same time transmitting the load inertia. Owing to the fact that the polar moment of inertia of the inner race and its associated loading structure is very small, the torque variations in the bearing will be only negligibly damped by the loading assembly. The damping fluid 62 in which blades 60 of loading rotor 58 are disposed keep the rotor from swinging or rotating without at the same time floating the rotor. In the transducer systems of the type I employ, the actual motion of the inner race and its adapter under test is small, usually being of the order of one degree for most systems. As a consequence, the torque due to twisting of the wire 64 is negligible. Since the loading assembly adds very little to the polar moment of inertia of the inner race and adapter, there is negligible damping in the system and the system response is very rapid. Relatively high measuring speeds of the order of 10 to 100 R. P. M. can be used. The testing time required to test bearings is correspondingly shortened.

As has been explained hereinabove, one of the disadvantages of the prior art torque testing devices is the difficulty of interpreting the recorded trace produced by the measuring system. In my testing device, the output voltage of transducer 78 represents the instantaneous value of bearing torque. This output voltage may be likened to a direct current voltage with an alternating current modulating signal impressed thereon. As can be seen by reference to Figure 3, the voltage when so considered includes a direct current voltage $E_{avg}$ which represents the steady, average, or continuous torque which would be the voltage indicated if the loading rotor damping were sufficiently high to eliminate torque variation entirely. The alternating current modulating signal designated $E_{var}$ represents variations in torque from the average torque resulting from inaccuracies in the bearing balls, races, and retainers.

Figure 2:
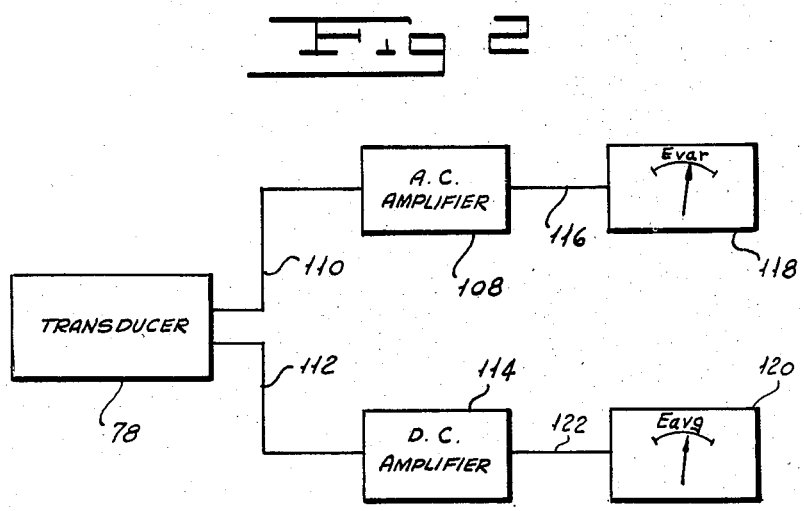
Figure 2 is a block diagram of the electrical system employed in my direct reading torque tester.

Referring now to Figure 2, I have provided an electrical system which separates the average output voltage of the transducer from the variable output signal representing torque variations. I impress one component of the output voltage of transducer 78 on an alternating current amplifier 108 by a conductor 110. A second conductor 112 connects another component of the output signal from transducer 78 to a direct current amplifier 114. The alternating current amplifier passes only the variable voltage $E_{var}$ representing variations in bearing torque. A conductor 116 impresses this amplified variable voltage on an appropriate indicating device 118. This indicating device 118 may indicate peak variation, R. M. S. value, standard deviation, or alternating current torque. It may be arranged to indicate a pass-fail test for a predetermined acceptance standard of torque variation.

The amplifier 114 passes only the steady state or average component of transducer output voltage. I impress this amplified average component on an indicating device 120 by a conductor 122. The indicating device 120 indicates steady state or average torque and may be set up in a pass-fail test, or the like, in a manner similar to the manner in which device 118 was set up.

My means of separating the transducer output signal into one component indicating average torque and a second component indicating torque variation provides a torque test in which these two torque characteristics may be determined directly. The difficulty involved in interpreting the trace of a recorder has been eliminated. It is to be noted, moreover, that when this indicating system is used with the testing device described in connection with Figure 1, a very nearly true indication of torque variation is provided by the indicating device 118, since damping owing to the loading assembly has very nearly been eliminated. While I have shown the system of Figure 2 as being employed in connection with the device shown in Figure 1, it is to be understood that this system may be employed in connection with devices other than one of the type shown in Figure 1.

In use, when a bearing is to be tested on my device, I press button 100 to rotate lever 94 in a clockwise direction as viewed in Figure 1. This action permits switch 106 to open and breaks the circuit of motor 18. It also raises tube 86 against the action of spring 88 to clamp head 72 to the locking yoke 40. I remove adapter 68 from stud 66 and place the bearing 48 to be tested in bore 50 of outer race adapter 46 with its outer race 52 resting on shoulder 54 of the adapter. I then thread the inner race adapter 68 onto stud 66. To begin the test, I release button 100 to permit spring 88 to move tube 86 downwardly to release head 72 and apply the load of loading rotor 58 to the bearing inner race. As tube 86 moves downwardly under the influence of spring 88, lever 94 rotates in a counterclockwise direction, as viewed in Figure 1, so that finger 104 closes switch 106 to start motor 18. Motor 18 rotates drive member 22 to drive rotor 30 and the outer bearing race 52. Owing to the fact that the polar moment of inertia of the loading assembly of the tester is low and damping is negligible, a relatively high testing speed may be employed. This low moment of inertia results from the supporting wire 64. Wire 64 also maintains the alignment of the bearing under test.

Figure 3:
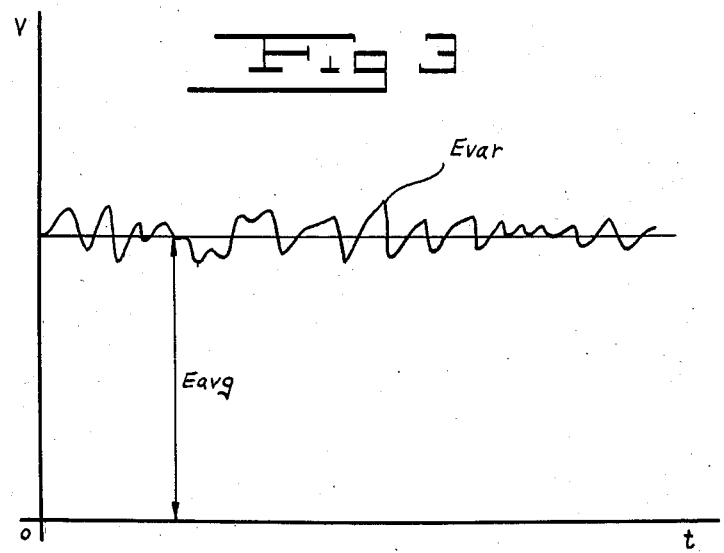
Figure 3 is a diagrammatic view showing the nature of the output signal from the transducer of my direct reading torque tester.

As the outer race 52 rotates, torque arm 74 resists the tendency of the inner race 56 to rotate and the transducer 78 produces an output voltage signal representative of the instantaneous bearing torque. As is shown in Figure 3, this signal includes a component $E_{avg}$ which represents the steady state or average torque and a component $E_{var}$ which represents variations in torque resulting from inaccuracies in the balls, races, and retainers of the bearing under test.

When the form of indicating means shown in Figure 2 is employed in connection with the tester shown in Figure 1, the output signal from the transducer is fed to respective alternating and direct current amplifiers 108 and 114. Amplifier 108 passes only the variable component $E_{var}$ while amplifier 114 passes only the average component $E_{avg}$ representative of average torque. After being amplified, these respective components are impressed on indicating devices 118 and 120 to provide a direct indication of torque variation and average torque.

When a test has been completed for a predetermined number of revolutions, button 100 is again pressed to stop motor 18 and relieve the bearing under test of the test load. It is to be understood that various size adapters 46 and 68 may be employed to test bearings of different sizes.

It will be seen that I have accomplished the objects of my invention. I have provided a direct reading torque tester which tests rolling bearings in a rapid and expeditious manner. Relatively high speeds may be employed in the tester since damping, owing to the loading rotor of the tester, has been reduced to a negligible amount. My tester produces an output signal which is very nearly a true representation of the instantaneous torque in the bearing being tested. I have provided my tester with means for indicating directly both the average torque and the torque variation of the bearing under test. I have eliminated the necessity for interpreting a bearing trace such as is necessary in testers of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A torque tester for determining the torque characteristics of a rolling bearing having a pair of races including in combination means for supporting said bearing by a first of said races, means for rotating said supporting means to rotate said first race, a load, a supporting member of small cross-sectional area for suspending said entire load from the second of said races, means for restraining said second race from rotation, means responsive to said restraining means for producing an output signal including a first component representing average torque and a second component representing torque variations, means for separating said first component from said second component, first indicating means responsive to said separated first component, and second indicating means responsive to said separated second component.

2. A torque tester for determining the torque characteristics of a rolling bearing having a pair of races including in combination means for supporting said bearing by a first of said races, means for rotating said supporting means to rotate said first race, a load, a supporting wire for suspending said entire load from the second of said races, means for restraining said second race from rotation, means responsive to said restraining means for producing an output signal representing the instantaneous value of torque in said bearing, and indicating means responsive to said output signal.

3. A torgue tester as in claim 2 in which said means for supporting said bearing includes a base, a rotor, means rotatably supporting said rotor on said base, and means supporting said bearing by a first one of its races on said rotor, said means for rotating said supporting means including a drive for said rotor.

4. A torque tester as in claim 2 in which said load includes a loading rotor carried by said supporting wire and means for damping said loading rotor.

5. A torque tester as in claim 2 in which said load includes a loading rotor, and damping blades carried by said rotor, said bearing support means forming means for containing a supply of damping fluid, the arrangement being such that the damping blades are immersed in said damping fluid.

6. A torque tester as in claim 2 in which said means for restraining said second race from rotation includes a torque arm, said means responsive to the restraining means including a transducer responsive to displacement of said torque arm.

7. A torque tester as in claim 2 including means for relieving said second race from said load.

8. A torque tester as in claim 2 including means for suspending said wire from said second race, a locking member, means for moving said wire suspending means into engagement with said locking means to relieve said second race from said load, biasing means normally rendering the means for moving the wire suspending means into engagement with the locking means ineffective, and manually operable means for operating said moving means against the action of said biasing means.

9. A torque tester as in claim 2 including a friction drive for said supporting means, and means normally rendering said drive ineffective.

References Cited in the file of this patent

UNITED STATES PATENTS

| | | |
|---|---|---|
| 2,448,322 | Piety | Aug. 31, 1948 |
| 2,471,423 | Gisser | May 31, 1949 |
| 2,553,833 | Riffenbergh | May 22, 1951 |
| 2,700,298 | Anderson | Jan. 25, 1955 |
| 2,707,393 | Hardway | May 3, 1955 |
| 2,722,824 | Jensen et al. | Nov. 8, 1955 |

FOREIGN PATENTS

| | | |
|---|---|---|
| 320,614 | Great Britain | Oct. 16, 1929 |